Sept. 22, 1964  R. W. CASHMAN ETAL  3,149,852
CHUCKING APPARATUS

Filed Feb. 9, 1962  2 Sheets-Sheet 1

*INVENTORS*
ROBERT W. CASHMAN
ANTHONY WASCO, JR.
BY
*Learman, Learman & McCulloch*

ATTORNEYS

United States Patent Office 3,149,852
Patented Sept. 22, 1964

3,149,852
CHUCKING APPARATUS
Robert W. Cashman and Anthony Wasco, Jr., Saginaw, Mich., assignors to Saginaw Machine and Tool Company, Saginaw, Mich., a corporation of Michigan
Filed Feb. 9, 1962, Ser. No. 172,261
14 Claims. (Cl. 279—4)

This invention relates to machine tools and more particularly to chucking apparatus operable to clamp and release a workpiece at the beginning and conclusion of machining operations.

An object of the invention is to provide chucking apparatus which is so constructed as to avoid the imposition of undesirable forces on the workpiece supporting parts of the apparatus during driving of the apparatus.

Another object of the invention is to provide chucking apparatus having a rotatable spindle shaft and in which the mechanism for driving the spindle is capable of transmitting only torque to the spindle shaft.

A further object of the invention is to provide chucking apparatus of the kind having chuck clutching and declutching means and actuating means therefor that react only between the rotatable spindle shaft and the chuck actuating means so as to avoid the imposition of any loads on the spindle supporting or driving mechanisms.

A further object of the invention is to provide improved pressure fluid actuating mechanism in a chucking device of the character described.

Another object of the invention is to provide pressure fluid actuating apparatus of the kind referred to wherein the effective force applied by the actuating mechanism may be varied without requiring modification of the chucking apparatus or any of its driving and operating mechanisms.

Figure 1:
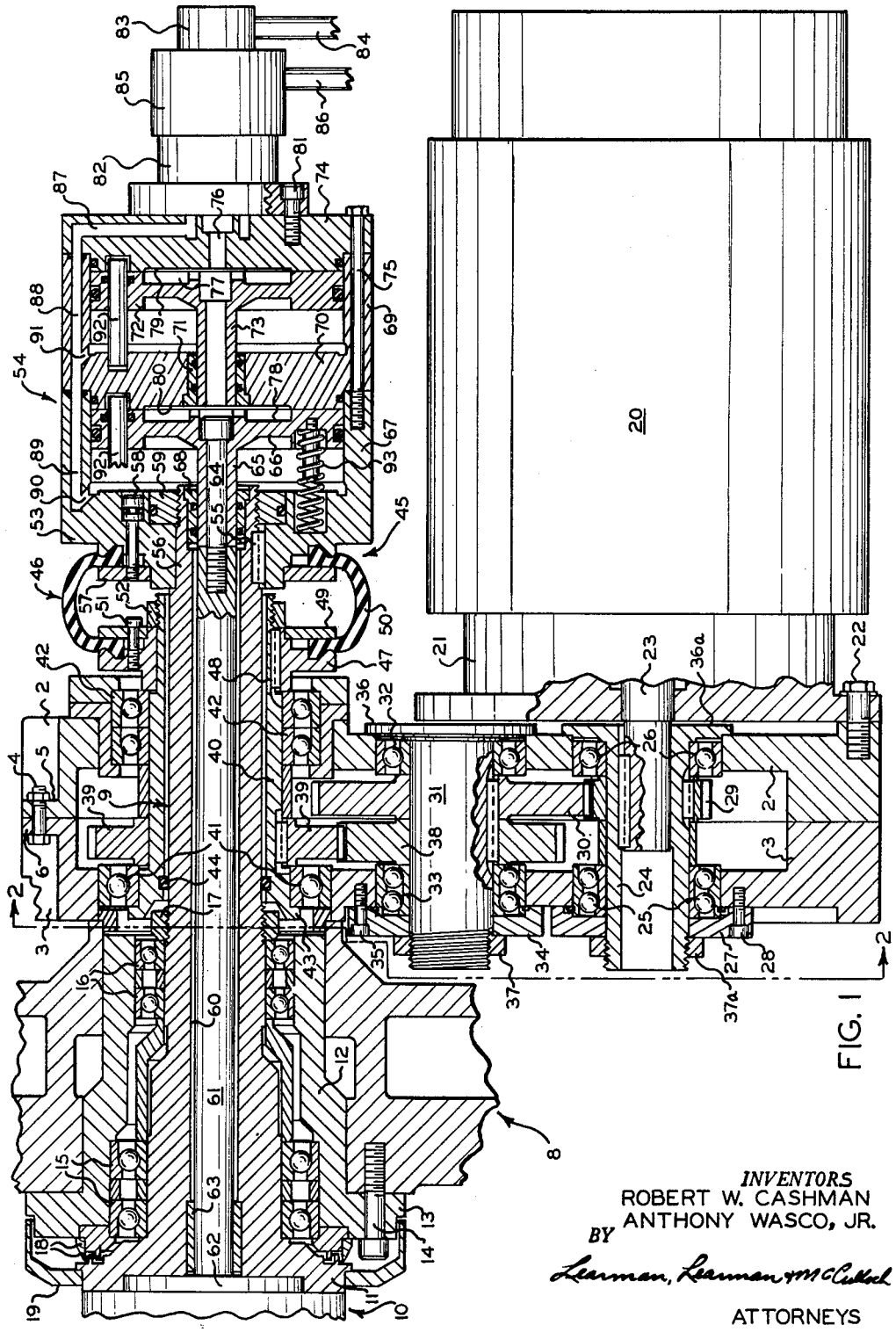
Figure 2:
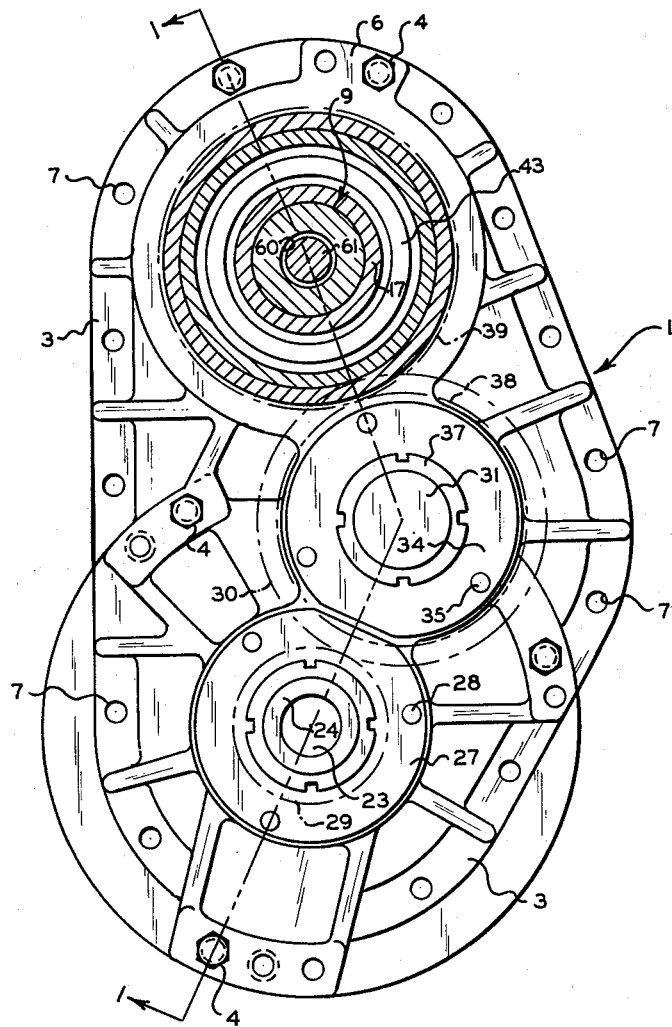

Other objects and advantages of the invention will be pointed out specifically or will become apparent from the following description when it is considered in conjunction with the appended claims and the accompanying drawings, wherein:

FIGURE 1 is a fragmentary, partly side elevational and partly sectional view of chucking apparatus constructed in accordance with the invention, the section being taken on the line 1—1 of FIGURE 2; and FIGURE 2 is a view partly in end elevation and partly in section, the section being taken on the line 2—2 of FIGURE 1.

Apparatus constructed in accordance with the invention comprises a main frame 1 composed of a pair of frame sections 2 and 3 that may be secured to one another by suitable means such as bolts 4 which extend through aligned openings in flanges 5 and 6 that project beyond the sections 2 and 3, respectively. The edges of the frame members 2 and 3 are provided with aligned openings 7 that are adapted to receive bolts by means of which the frame 1 may be secured to a table or frame member 8 of a boring, turning, grinding or other machine or, alternatively, the member 8 may form an integral part of the frame 1.

Extending through the frame members 1 and 8 is a spindle shaft 9 to one end of which is secured in a conventional manner any one of a number of well known clutching and declutching chucks 10 having jaws or the like which are operable to clutch and declutch a workpiece. The spindle shaft 9 has an annular flange 11 at one end and is rotatably mounted within a spindle housing 12 having a flange 13 at its corresponding end which overlies and is secured to the frame member 8 by suitable means such as bolts 14. Means is provided for rotatably mounting the spindle shaft and comprises spaced bearing assemblies 15 and 16 interposed between the shaft 9 and the housing 12 to provide for free relative rotation therebetween. Intermediate its ends, the shafts 9 is threaded to accommodate a nut 17 which maintains the bearings 15 and 16 in assembled relation with the shaft housing 12. The flange 13 of the spindle housing preferably is provided with a number of annular projections 18 which are received in grooves formed in the spindle flange 11 to prevent foreign matter from entering the space between the spindle shaft and its housing, and the spindle flange 11 may be provided with a cup-shaped shield 19 which nests with the housing flange 13 for the same purpose.

Driving means is provided for rotating the spindle shaft 9 and comprises an electric motor 20 having a housing 21 that is bolted to the frame member 2 by means of bolts 22, the motor having an armature shaft 23 that is keyed or otherwise suitably fixed to a hollow shaft 24 which is journaled for rotation in the frame 1 by means of bearing assemblies 25 and 26. Overlying the bearing assembly 25 is a bearing retainer 27 that may be fixed to the frame member 3 by suitable means such as bolts 28. Fast on the shaft 24 is a pinion 29 that meshes with a gear 30 which is fast on a countershaft 31 that extends through the frame 1. The shaft 31 is rotatably journaled in the frame 1 by bearing assemblies 32 and 33, the bearings being retained in assembled relation by a bearing retainer 34 that is fixed to the frame member 3 by bolts 35, and the shaft 31 is restrained against axial movement by a flange 36 at one end and a nut 37 at its other end. A similar flange 36a and nut 37a prevent axial movement of the shaft 24.

The countershaft 31 also has keyed thereto a gear 38 that meshes with a gear 39 which is keyed to a driven sleeve 40 which surrounds the spindle shaft 9 and is coaxial therewith. The sleeve 40 is journaled for rotation in the frame 1 by bearing assemblies 41 and 42, the sleeve having a flange 43 at one end against which the bearings react to maintain the bearings in assembled relation with the sleeve 40. The sleeve 40 is independent of the spindle shaft 9, although an O-ring or other seal 44 preferably is interposed between the shaft and the sleeve to prevent foreign matter from entering the space therebetween.

Motion transmission means 45 interconnects the driven sleeve 40 and the spindle shaft 9 for rotating the latter and includes a flexible force transmitting device 46 which is capable of transmitting torque only. The device 46 includes a flanged clamping ring 47 which is keyed as at 48 to the sleeve 40 so as to rotate with the sleeve. Associated with the clamping ring 47 is a clamp member 49, and between the clamp members 47 and 49 is clamped one edge of an annular, rubber-like, flexible boot 50. A number of bolts 51 securely maintain the clamping rings 47 and 49 in clamping engagement with the edge of the boot 50. The clamp members 47 and 49 are maintained in fixed relation on the sleeve 40 by means of a nut 52 that is threaded onto the end of the sleeve, the nut not only fixing the clamp members but also cooperating with the sleeve flange 43 to maintain the bearings 41 and 42 in assembled relation with the sleeve.

The motion or drive transmitting mechanism 45 also includes an end wall 53 forming part of the chuck operating mechanism 54, to be described hereinafter more fully, the end wall 53 being keyed as at 55 on the reduced end portion 56 of the spindle shaft 9. The wall 53 functions in conjunction with a clamping ring 57 to clamp the opposite edge of the flexible boot 50, a number of clamping screws 58 extending through the members 53 and 57 so as to maintain the boot securely clamped therebetween. The member 53 is counterbored to receive a nut 59 that is threaded onto the reduced end 56 of the shaft 9 so as to fix the apparatus 54 against longitudinal displacement relative to the shaft 9.

The construction and arrangement of the apparatus described thus far are such that rotation of the motor armature shaft 23 effects rotation of the sleeve 40 through the train of gears. Rotation of the driven sleeve 40 is transmitted through the flexible boot 50 to the member 53, and rotation of the member 53 is transmitted to the spindle shaft 9. Since the driven sleeve 40 is independent of the shaft 9 and since the flexible and resilient boot 50 is capable of transmitting torque only to the shaft 9, there can be no lateral forces imposed on the spindle 9 which would cause it to deflect. Consequently, the chuck 10 will rotate about a true axis.

The spindle shaft 9 is provided with a longitudinally extending bore 60 in which is received a longitudinally reciprocable actuating rod 61 that is connected at one end to a plate 62 which functions in a conventional manner to manipulate the jaws of the chuck 10 to clamp and unclamp a workpiece. The end of the actuating rod 61 adjacent the chuck 10 is supported in a bushing 63 and at its other end is secured by means of a bolt 64 which extends through a hollow piston rod 65 that is integral with and projects from a piston 66 which is reciprocable in a cylinder 67 forming part of the operating apparatus 54. The piston rod 65 is supported by a bushing 68 that is fitted to the spindle shaft 9.

In separable tandem relationship with the cylinder 67 is a cylinder 69 having an end wall 70 provided with a central opening in which is mounted a bushing 71 similar to the bushing 68. A piston 72 that is similar to the piston 66 is reciprocably mounted in the cylinder 69 and is provided with a forwardly projecting, hollow piston rod 73 that corresponds to the piston rod 65. The rear end of the cylinder 69 is closed by a separable cap 74. The cylinders 67 and 69 may be maintained in assembled relation with one another and with the cap 74 by a plurality of bolts 75.

The cylinder cap 74 is provided with a central port 76 which registers with the bore of the piston rod 73. The rear face of the piston 72 is provided with an annular fluid chamber 77 and a similar chamber 78 is provided in the rear face of the piston 66. The forward face of the end cap 74 is provided with an annular fluid recess 79 and a similar recess 80 is formed in the forward face of the cylinder wall 70.

Fixed to the end cap 74 by means of screws 81 is a housing 82 provided with fluid passages in communication with the port 76. Rotatably mounted on the housing 82 is a coupling 83 of known construction having passages in communication with the port 76, and to which is connected a pressure fluid delivery tube 84 which leads to a source (not shown) of pressure fluid.

Also rotatably mounted on the housing 82 is a coupling 85 that is independent of the coupling 83 and to which is connected a fluid delivery tube 86 which leads to the source of pressure fluid. The coupling 85 communicates with ports in the housing 82 that communicate with a passage 87 formed in the end cap 74. The passage 87 is in communication with a passage 88 that extends longitudinally of the cylinder 69. The cylinder 67 is provided with a longitudinal passage 89 that communicates with the passage 88 and terminates in a port 90 that leads into the cylinder cavity adjacent the wall 53, a similar port 91 branching off from the passage 88 and communicating with the cavity of the cylinder 69 adjacent the end wall 70.

The construction and arrangement of the operating mechanism 54 are such that fluid delivered under pressure by a pump or the like from the fluid source through the tube 84 passes through the rotatable coupling 83 and into the housing 82 and is delivered through the port 76 into the cylinder 69. Pressure fluid will flow into the chamber 77, due to the recess 79, and pressure fluid also will flow through the hollow piston rod 73 into the cylinder 67. The bolt 64 will prevent fluid from flowing through the hollow piston rod 65, thereby causing the fluid to enter the chamber 78 via the recess 80. When the force of pressure fluid acting on the rear surfaces of the pistons 66 and 72 is equalized, continued pumping of pressure fluid in the direction of the arrow through the tube 84 will cause the pistons to be displaced simultaneously to the left, as viewed in FIGURE 1, so as to shift the actuating rod 61 and actuate the jaws of the chuck 10. It will be understood that fluid in the cylinders forwardly of the pistons will be discharged and a valving arrangement that is conventional in the art may be provided to control the flow of fluid. When it is desired to shift the actuating rod 61 in the opposite or rearward direction, suitable valves (not shown) are manipulated to cause pressure fluid to be introduced to the coupling 85 through the tube 86 for delivery to the pistons 67 and 69 via the passages 87, 88 and 89 and the ports 90 and 91 so as to move the pistons 66 and 72 to the right as viewed in FIGURE 1.

The apparatus 54 rotates with the spindle shaft 9 and relative to the couplings 83 and 85. In order to avoid relative rotation between the pistons 66 and 72 and their respective cylinders, guide pins 92 may be provided to cooperate with the pistons and the end walls of the respective cylinders. If desired, a spring return device 93 may be provided in either or both cylinders to bias the pistons in one direction or the other, and preferably the spring device 93 is so positioned as to urge the actuating rod 61 toward its chuck jaw clamping position so as thereby to provide a safeguard against inadvertent declutching of a workpiece.

The actuating mechanism has been disclosed as including two cylinders and two pistons, but the number of cylinders and pistons incorporated in the apparatus will depend upon the amount of force desired to be exerted by the chuck jaws on a workpiece. For example, if a relatively small force is required, the cylinder 69 and its piston 72 may be dispensed with, in which event the end cap 74 will be mounted directly on the cylinder 67. Shorter bolts then may be substituted for the bolts 75. Alternatively, if greater chuck actuating forces are desired, one or more additional cylinders and pistons may be interposed between the cylinder 69 and the end cap 74 and bolts longer than the bolts 75 used to couple all of the cylinders together. The addition and substraction of cylinders requires no modification of the driving or actuating mechanisms.

A particularly important characteristic of the invention resides in the relationship among the operating mechanism 54, the actuating rod 61 and the spindle shaft 9. As will be apparent from the foregoing description, the operating mechanism 54 is supported solely by the spindle shaft 9 and reacts solely with the latter to effect reciprocation of the actuating rod 61. As a result, reciprocation of the pistons of the operating mechanism effects only relative movement between the spindle shaft and the actuating rod. That is, operation of the actuating mechanism does not tend to effect relative movement between the spindle shaft 9 and its mounting or driving means. Consequently, neither the bearings nor the driving parts are subjected to any load upon actuation of the clutching and de-clutching mechanism, whereby strains, wear, and misalignment due to such loads are avoided.

The disclosed embodiment is representative of a presently preferred form of the invention, but is intended to be illustrative rather than definitive thereof. The invention is defined in the claims.

We claim:

1. Chucking apparatus comprising a rotatable spindle; clutching and declutching chuck means supported by said spindle; means mounting said spindle for rotation; driving means; driven means connected to and driven by said driving means; means mounting said driven means independently of said spindle; and motion transmitting means interconnecting said driven means and said spindle for rotating the latter, said motion transmitting means including flexible coupling means capable of transmitting rotation only.

2. Apparatus as set forth in claim 1 including actuating means connected to said chuck means and reciprocable longitudinally of said spindle for clutching and declutching said chuck means.

3. Apparatus as set forth in claim 2 including pressure fluid operating means connected to said actuating means for reciprocating the latter.

4. Apparatus as set forth in claim 3 wherein said operating means comprises a cylinder having at least one piston reciprocable therein.

5. Apparatus as set forth in claim 3 wherein said operating means comprises a number of communicating cylinders each having a piston therein, and means maintaining said cylinders assembled.

6. Chucking apparatus comprising a rotatable spindle; clutching and declutching chuck means supported by said spindle; means mounting said spindle for rotation; driving means; a cylindrical driven member independent of and concentric with said spindle connected to and driven by said driving means; and motion transmitting means interconnecting said driven member and said spindle for rotating the latter, said motion transmitting means including flexible coupling means capable of transmitting rotation only.

7. Apparatus as set forth in claim 6 wherein said driven member comprises an annular sleeve surrounding said spindle.

8. Apparatus as set forth in claim 6 including actuating means connected to said chuck means and reciprocable longitudinally of said spindle for clamping and releasing said chuck means.

9. Apparatus as set forth in claim 8 wherein said spindle is hollow and said actuating means extends through said spindle.

10. Apparatus as set forth in claim 9 including operating means reacting between said spindle and said actuating means for reciprocating the latter.

11. Apparatus as set forth in claim 10 wherein said operating means comprises a cylinder supported by and rotatable with said spindle and at least one piston reciprocable in said cylinder.

12. Apparatus as set forth in claim 10 wherein said operating means comprises a number of communicating cylinders each having a piston therein, and means maintaining said cylinders assembled.

13. Chucking apparatus comprising a rotatable spindle; clutching and declutching chuck means supported by said spindle; means mounting said spindle for rotation; driving means independent of said spindle; driven means independent of said spindle and connected to said driving means; motion transmission means interconnecting said driven means and said spindle and including flexible coupling means capable of transmitting torque only; actuating means connected to said chuck means for clutching and declutching the latter; and operating means supported solely by said spindle and reacting between said spindle and said actuating means for operating the latter.

14. Apparatus as set forth in claim 13 wherein said motion transmission means is comprised in part by said actuating means.

References Cited in the file of this patent

UNITED STATES PATENTS

| | | |
|---|---|---|
| 2,548,096 | Bryany | Apr. 10, 1951 |
| 2,880,009 | Gamet | Mar. 31, 1959 |
| 2,911,765 | Studler | Nov. 10, 1959 |
| 3,020,737 | Firth | Feb. 13, 1962 |